United States Patent
Wang et al.

(10) Patent No.: US 11,127,066 B2
(45) Date of Patent: Sep. 21, 2021

(54) MULTI-LAYER OPTIMIZATION FOR A MULTI-SIDED NETWORK SERVICE

(71) Applicant: Uber Technologies, Inc., San Francisco, CA (US)

(72) Inventors: Yuyan Wang, San Francisco, CA (US); Xian Xing Zhang, Mountain View, CA (US); Isaac Suyu Liu, Fremont, CA (US); Yuanchi Ning, San Francisco, CA (US); Chen Peng, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 387 days.

(21) Appl. No.: 16/116,054

(22) Filed: Aug. 29, 2018

(65) Prior Publication Data

US 2020/0074523 A1 Mar. 5, 2020

(51) Int. Cl.
*G06Q 30/06* (2012.01)
*G06N 7/00* (2006.01)
*G06N 20/00* (2019.01)
*G06F 16/248* (2019.01)
*G06F 16/9535* (2019.01)
*G06F 16/2457* (2019.01)

(52) U.S. Cl.
CPC ....... *G06Q 30/0631* (2013.01); *G06F 16/248* (2019.01); *G06F 16/24578* (2019.01); *G06F 16/9535* (2019.01); *G06N 7/005* (2013.01); *G06N 20/00* (2019.01)

(58) Field of Classification Search
CPC .......................... G06Q 30/0631; G06N 7/005
See application file for complete search history.

(56) References Cited

U.S. PATENT DOCUMENTS

| | | | |
|---|---|---|---|
| 2008/0270209 A1* | 10/2008 | Mauseth | G06Q 10/10 705/7.29 |
| 2018/0308133 A1* | 10/2018 | Geist, Jr. | G06Q 30/0271 |
| 2019/0130296 A1* | 5/2019 | Basu | G06F 9/451 |

OTHER PUBLICATIONS

Luna, N. (Nov. 14, 2015). Food delivery: Amazon, DoorDash, postmates lead explosion of doorstep delivery options. TCA Regional News Retrieved from https://dialog.proquest.com/professional/docview/1732972747?accountid=131444.*

* cited by examiner

*Primary Examiner* — Resha Desai
(74) *Attorney, Agent, or Firm* — Fenwick & West LLP

(57) ABSTRACT

A computing system generates recommendations for users within the context of a network service. To account for objectives of various users associated with the network service, some of which may not reach optimality at the same time, the computing system generates values associated with each of the objectives separately. For example, for each objective, the system may train a computer model to produce a representative value. To generate a recommendation of an entity for a user, the system uses the generated objective values as inputs to an optimization algorithm. The optimization step may use linear programming or quadratic programming to generate a recommendation score, for example. This two-step process allows the system to account for multiple objectives and makes the system easily adaptable to change when the set of objectives is updated.

12 Claims, 4 Drawing Sheets

MULTI-LAYER OPTIMIZATION FOR A MULTI-SIDED NETWORK SERVICE

BACKGROUND

Field of Art

This disclosure relates generally to content recommendation, and in particular to optimizing recommendations in view of a plurality of objectives in a dynamic marketplace.

Description of Art

Dynamic marketplaces are improved when all marketplace participants benefit from their participation in the marketplace. Additionally, a system that operates a platform for such a marketplace may benefit when the marketplace participants behave in certain ways. For example, a system may operate a food delivery marketplace by providing a platform that connects restaurants, food delivery partners, and consumers. However, it can be difficult to simultaneously account for different requirements and optimal conditions for all of the marketplace participants.

SUMMARY

A recommendation system for a marketplace platform manages optimization of objectives for multiple categories of marketplace participants. The system provides recommendations of content items to present to consumers, where a consumer is a user of a network service such as a marketplace platform. The recommendations may be personalized for each consumer and they may be presented in a way that addresses the challenge of meeting multiple objectives in real time.

While an example of a food delivery service is presented herein as an example marketplace in which the recommendation system may be used, in other examples, the recommendation system and associated marketplace platform may be used in a variety of different marketplace environments, and the marketplace environments may have more or fewer objectives.

A first layer of the system includes models for each objective. In one embodiment, one of the models can be used to predict a probability that a consumer will order from a restaurant. This "demand prediction" model may accept data including user profile data about a consumer, data about the restaurant, and contextual data as inputs. The demand prediction model can then determine a prediction score for a consumer-restaurant pairing, where the prediction score is indicative, for example, of the likelihood that the consumer will choose to order food from the restaurant.

Other objective models in the first layer of the system may include models for generating various other predictive values. In one embodiment, the objective models include models of market fairness, gross earnings for the platform, delivery partner reliability, and consumer happiness. The objective models may be trained or unsupervised computer models, neural networks, or specific algorithms developed for generating particular objective values. In one embodiment, certain objective values may be predetermined, e.g., as set by a system administrator or manager of the marketplace platform system.

A second layer of the system generates recommendation scores (e.g., for an order in which the restaurants should be displayed to the consumer) by optimizing among the values output by the multiple objective models in the first layer. This second layer may thus be used to solve a constrained optimization problem, for example using linear or quadratic programming. Thresholds may be set for some of the objective values while the system optimizes for other objectives.

Modeling the various objective values independently from one another in the first layer of the system gives the system flexibility to add or remove different objective models without interfering with existing objectives, e.g., without a need to retrain existing objective models. For example, a system administrator could introduce a new objective model to the system and would only need to adjust the optimization algorithm to account for the additional or changed inputs. The multi-layer scheme also allows the various objective values to be generated in real time, further enabling the final recommendation of the system to account for the most current data (e.g., restaurants that are open now, available menus, available delivery partners, etc.).

The second layer of the system outputs a personalized recommendation of a restaurant for a consumer. By generating a personalized recommendation score for a consumer with respect to a set of restaurants, the system can determine a current ranking of restaurants to present to the particular consumer. The ranking information may be used to determine in what format or in what order restaurants should be presented to the consumer, for example, via an application on a client device like a smart phone, tablet, or computer that the consumer may be using to access the food delivery platform.

Figure 1:
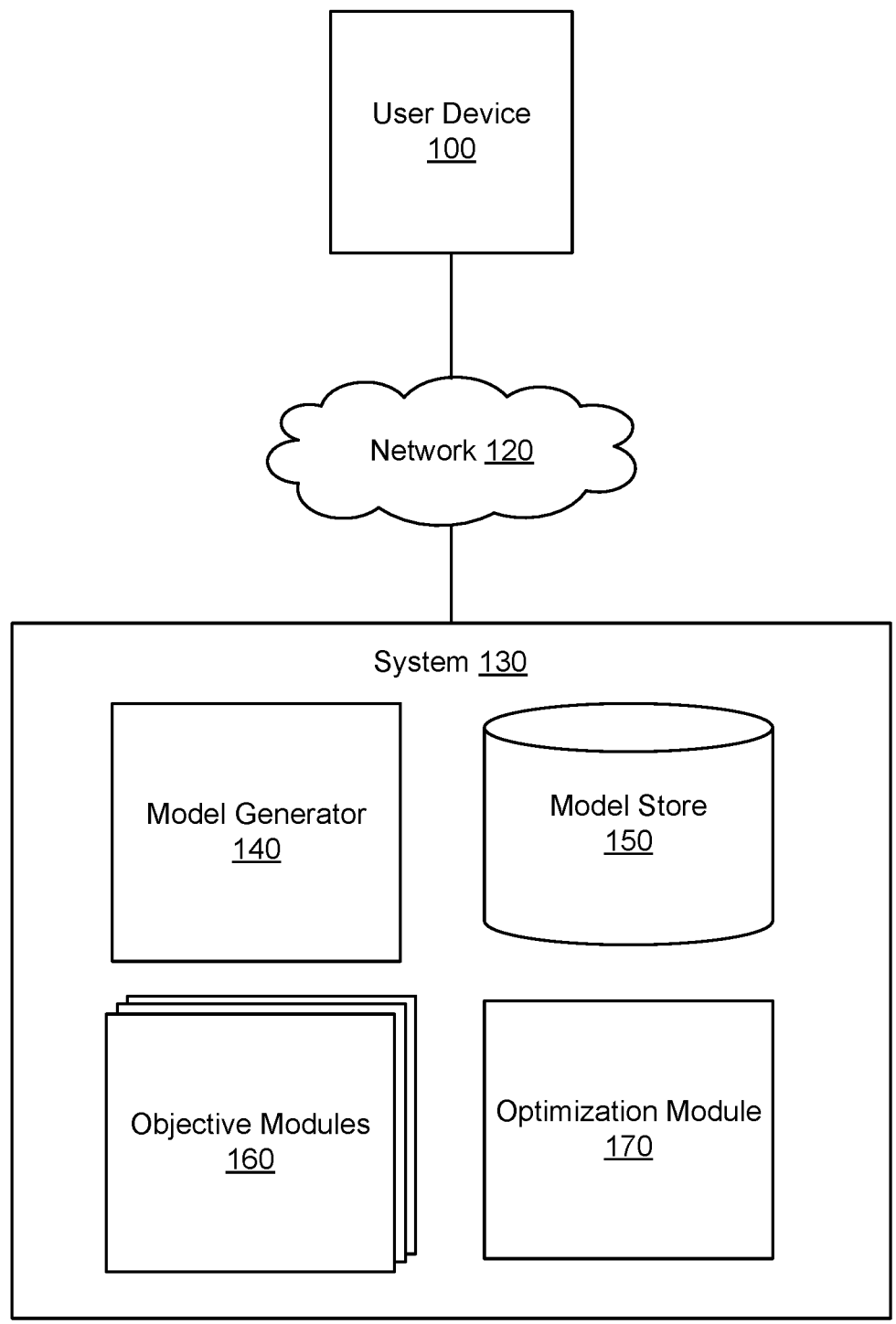
FIG. 1 is a high-level block diagram of a system environment and architecture of a system, in accordance with an example embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

For a marketplace to work efficiently, a network service, such as a food delivery marketplace system, can be configured to consider the interests of each category of marketplace participant. In some embodiments, the system may do this by providing a fair marketplace with exposure for entities associated with the marketplace. Restaurants are provided herein as an example of a type of entity that might be associated with a food delivery marketplace system. For example, the system provides exposure to restaurants so that the restaurants each have a chance to receive enough orders, and so that the delivery partners all have enough orders to deliver while also being available to deliver all consumer orders in a timely manner. The system will benefit from consumers who repeatedly choose to order food via the food delivery marketplace, and will thus benefit from measures that lead to consumer happiness and retention.

As the example of a three-sided food delivery marketplace demonstrates, providing a marketplace platform that optimizes metrics related to the objectives of all of the categories of participants can be a challenging and complex undertaking. This is especially true as the dynamics of such marketplaces may change rapidly, e.g., as participants from different categories of participants become active on the platform at different times throughout a day.

In particular, objectives associated with the different categories of participants are frequently in some degree of competition. That is, optimizing one objective may not also optimize the others. For example, in the case of the food delivery marketplace, there may be a tradeoff between optimizing an objective of high consumer conversion rate and optimizing an objective of marketplace fairness for the restaurants. Optimizing only for consumer conversion rate may result in a few popular restaurants being repeatedly included at the top of a list of recommended restaurants by the marketplace platform overseen by the system since consumers are known to order from those restaurants. However, this reduces marketplace fairness for new restaurants that may not yet be well known. Conversely, optimizing only for marketplace fairness by ensuring equal exposure of every restaurant may result in a lower consumer conversion rate as consumers may be less likely to find restaurants with food they want to order.

A computing system provides a marketplace platform for a marketplace (e.g., a network service), such as a dynamic marketplace. As described herein, a dynamic marketplace may be a marketplace in which marketplace participants (e.g., providers, sellers, consumers, browsers, delivery partners, etc.) may enter/view or leave the marketplace independently and at different times. For example, a food delivery marketplace may include three categories of marketplace participant: restaurants, consumers, and delivery partners. A consumer may enter the marketplace, such as by opening an application on a user device to access the marketplace platform, when the consumer wants to order food, and may leave the marketplace after placing an order with a restaurant. A delivery partner may enter the marketplace to signal availability for making deliveries and may leave the marketplace when the delivery partner is no longer available to make deliveries. The restaurants may be in the marketplace during their hours of business. Dynamics of marketplace participants can be further complicated by other factors (e.g., distance between restaurant and consumer) and number and type of categories of participants may vary among different types of marketplaces.

The system generates recommendations (e.g., recommending restaurants to consumers) while also accounting for variability in the nature, presence, and needs of marketplace participants. In particular, the system generates recommendations that can incorporate objectives for multiple categories of marketplace participants, such as consumer conversion rate for consumers, or marketplace fairness for restaurants. At a first stage, the system applies a plurality of objective models to feature values related to the marketplace participants. The objective models, operating independently of one another, produce objective values that represent different objectives that the marketplace participants may have. At a second stage, the system uses linear programming, quadratic programming, or another strategy to generate a recommendation that optimizes the various objective values. In some cases, the system may also account for threshold optimization values for different objectives, as it may not be possible for all objectives to be simultaneously optimal.

FIG. 1 is a high-level block diagram of a system environment and architecture of a system, in accordance with an example embodiment. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. For example, in one embodiment, the system 130 may coordinate food delivery from a restaurant to a customer via a delivery partner. Multiple user devices 100 operating in the system environment may be used for a variety of purposes by different users who are acting as participants in a marketplace for which the system 130 provides a platform. The system 130 generates recommendations for consumers in the marketplace. In the example of the food delivery marketplace, the system 130 may generate scores for restaurants that indicate whether the restaurant should be recommended to a particular consumer.

A user (e.g., a consumer, restaurant representative, or delivery partner) may enter location information, request deliveries, or otherwise communicate with the system 130 through a user device 100. User devices 100 can be personal or mobile computing devices, such as smartphones, tablets, notebook computers, or desktop computers. In some embodiments, the user device 100 executes a client application that uses an application programming interface (API) to communicate with the system 130 through the network 120.

In some embodiments, a consumer can make a request to the system 130 through operation of the user device 100. For example, a food delivery request may include one or more of user identification information, a food order, and a current location or the food delivery location for a consumer. The current location of a user device 100 and/or the food delivery location may be designated by the user, or detected using a location sensor of the user device 100 (e.g., a global positioning system (GPS) receiver).

In one embodiment, a user device 100 may send user information (e.g., consumer location, etc.) to the system 130 when an application associated with the system 130 is open on the user device. In this way, the system 130 can generate recommendations that are appropriate for the user's current situation. In some embodiments, the system 130 may request user data user information when the application associated with the system 130 is open on the user device 100 and communicating with the system 130. The user device 100 responds with all or a subset of the requested user information.

User devices 100 may interact with the system 130 through client applications configured to interact with the system 130. The client applications of the user devices 100 can present information received from the system 130 on a user interface, such as a list of restaurants and menus, a map of the geographic region of a user, and the current location of the user device 100. The client application running on the user device 100 may be able to determine the current location of the user device 100 and provide the current location to the system 130.

The user devices 100 can communicate with the system 130 via the network 120 which may comprise any combination of local area and wide area networks employing wired of wireless communication links. In some embodiments, all or some of the communication on the network 120 may be encrypted.

As illustrated in FIG. 1, the system 130 includes various modules and data stores for use in providing a marketplace platform and for generating restaurant recommendations for consumers. The system 130 comprises a model generator 140, a model store 150, one or more objective modules 160, and an optimization module 170. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 1 and the functionality of the components as described herein may be distributed differently from the description herein.

The model generator 140 trains models for quantifying a variety of objectives. The computer models may be supervised or unsupervised models. Supervised models may be trained by the model generator 140 using labeled training data (e.g., data from past interactions of market participants with the system 130). In some embodiments, the model generator 140 manages the generation of different kinds of models for different objectives, such as consumer conversion rate or marketplace fairness. In some embodiments the model generator 140 retrains or updates the models for some or all of the objectives. Model updates may occur when new training data is obtained, periodically, or on another schedule (e.g., weekly, daily, etc.).

Models and algorithms that generate values associated with different objectives may be stored in the model store 150. The model store 150 is a data store that in various embodiments may store labeled training data, unlabeled training data, and/or trained computer models (e.g., decision trees, neural networks, etc.).

The objective modules 160 use models and algorithms from the model store 150 to generate objective values, that is, values related to objectives that the different marketplace participants might have. In some embodiments, one objective module 160 may handle the application of models for each of a plurality of objectives. In one embodiment, as shown herein for the sake of clarity, separate objective modules 160 manage the generation of values for each of the objectives. For example, one objective module 160 may generate a score of market fairness using a market fairness model from the model store 150 and another objective module 160 may generate a value representative of predicted gross earnings using another model from the model store 150.

The optimization module 170 generates a recommendation score (e.g., indicative of whether a restaurant should be recommended to a user, an order in which to recommend a restaurant to a user, etc.) based on the one or more objective values generated by the objective modules 160. The optimization module 170 uses quadratic programming, linear programming, or another optimization technique to determine a recommendation score that optimizes among the objectives. In some embodiments, the optimization module is preprogrammed with quadratic programming rules (e.g., equations) that define how to make trade-offs when the various objectives are not all optimized by the same input. The optimization module 170 may include threshold optimization values for each of the objectives represented by objective modules 160. For example, the optimization module 170 may include a rule to maximize a value of one of the objectives (e.g., restaurant gross bookings) while setting constraints on the amount of variation that is acceptable for the values of each of the other objectives (e.g., customer happiness). In one embodiment, a resulting optimization problem yields an overall recommendation score as a combination of the values associated with the objectives, each value having a weight associated with a threshold optimization value that represents the amount of acceptable variation. The threshold optimization values, as well as other equations and inequalities related to the quadratic programming may be preprogrammed (e.g., by a system administrator or developer of the system 130).

The modular configuration of the system 130 makes it possible for objectives to be added to or removed as inputs to generating recommendation scores without having to retrain a model each time. Instead, to incorporate a new objective, the model generator 140 trains a model to produce values related to the new objective and the system 130 may allocate an objective module 160 to manage the use of the new model. Additionally, the optimization module 170 may be updated to incorporate a new input value (as received from the objective module 160 relating to the new objective) into the quadratic or linear programming scheme. For example, equations used by the optimization module 170 may be updated to include a variable representative of the new input value and threshold values related to the new objective may also be added to the optimization scheme.

Figure 2:
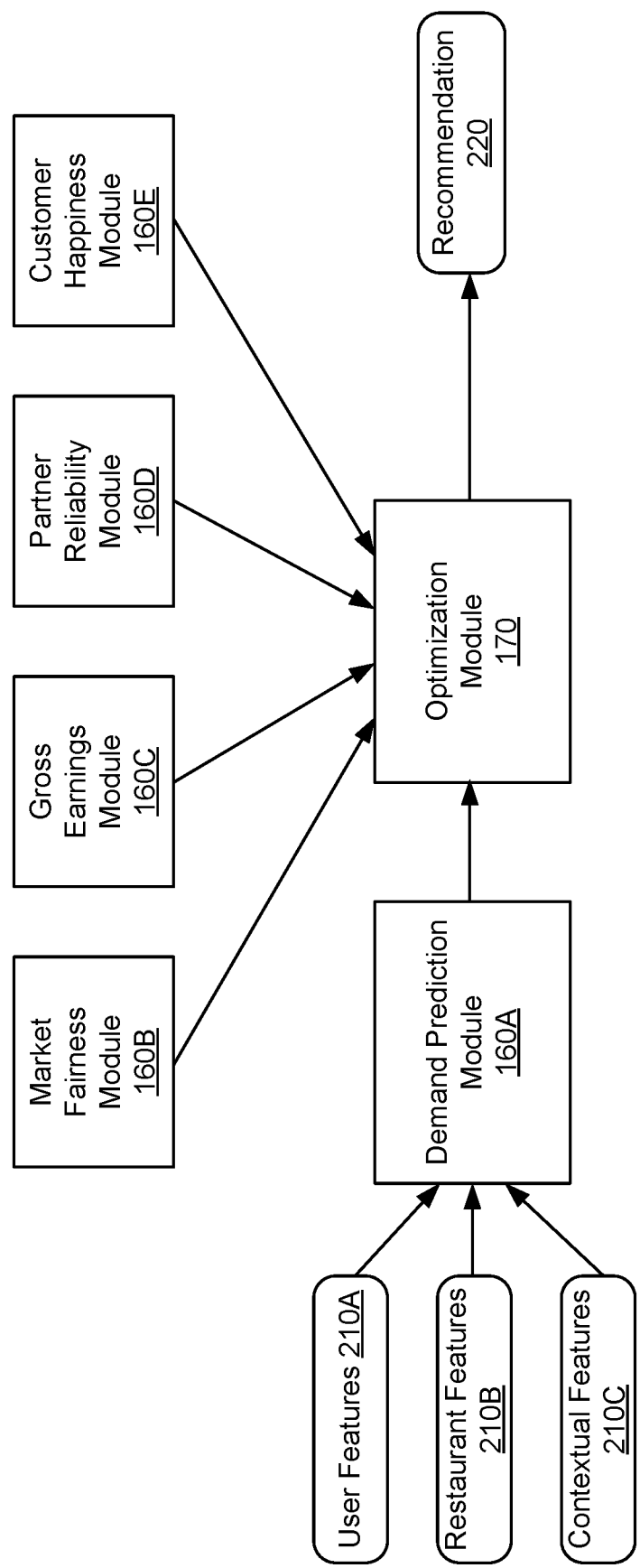
FIG. 2 is a data flow diagram illustrating a process for generating a recommendation, in accordance with an example embodiment.

FIG. 2 is a data flow diagram illustrating a process for generating a recommendation, in accordance with an example embodiment. In particular, the process of FIG. 2 generates a recommendation 220 in the form of a score indicating, for a given consumer-restaurant pair, whether the restaurant should be recommended to the particular consumer. For example, in one embodiment, after generating recommendation scores for a user with respect to multiple restaurants, a ranking of the recommendation scores determines an order in which a client application should present the restaurants to the consumer via the consumer's user device 100.

Features 210 are input into the objective modules 160. Different objective modules may require different features 210. FIG.2 depicts a demand prediction module 160A, that is, an objective module 160 that generates a value for the objective of optimizing consumer demand. The demand prediction module 160A generates a likelihood score that represents a predicted likelihood that a consumer will find an entity (e.g., a restaurant) to be favorable, which may lead, for example, to the consumer ordering from a restaurant. The demand prediction module 160A accepts user features 210A for a consumer, restaurant features 210B for a restaurant, and contextual features 210C as inputs.

Objective modules 160 may use a variety of features 210 that are obtained by the system 130. User features 210A may include information about a user device 100 or about a user of the user device (e.g., a consumer, delivery partner, or the like). Particular user features 210A required by an objective module 160 may vary based on the nature of the objective. Examples of user features 210A as may be used by the demand prediction module 160A include: past interactions of the consumer with the marketplace, past interactions of the consumer with the restaurant, restaurant links the consumer has clicked on in the past, restaurants the consumer has ordered from in the past, dishes the consumer has ordered in the past, dishes that similar consumers (e.g., like-minded, located nearby, etc.) order, and so forth.

In the example case of a food delivery marketplace, the demand prediction module 160A also receives restaurant features 210B as inputs. Examples of restaurant features 210B include: dishes on a menu of the restaurant, most popular dishes, a number of views of the restaurant, a number of impressions the restaurant has received, a number of orders the restaurant has received, an estimated time that food will be ready, a type of cuisine, hours of operation, and restaurant location.

As an additional example of inputs, the demand prediction module 160A accepts contextual features 210C. Contextual features are features that provide information about the context of a potential food delivery transaction. For example, the type of food a consumer is likely to order may vary based on the time of day that the consumer accesses the marketplace via a client application on a user device 100 (e.g., at 9 a.m. a consumer may want to order breakfast food). Examples of contextual features 210C for the demand prediction module 160A include: a current location of the consumer, a delivery address, the time of day, the day of the week, whether it is a holiday, the meal period (e.g., breakfast, lunch, dinner), the weather at the user's location, and the like.

In addition to the demand prediction module 160A, the example of FIG. 2 shows four other objective modules 160. The four additional modules depicted for use in the recommendation process include a market fairness module 160B, a gross earnings module 160C, a partner reliability module 160D, and a customer happiness module 160E. Objective modules 160 may each require differing sets of input data, as they are producing results related to different objectives.

The market fairness module 160B may generate one or more values related to how fair the marketplace is, that is, related to how even the distribution of custom is among a set of restaurants. In one embodiment, the market fairness module may produce a fairness score that indicates how presentation of the restaurant to the consumer will affect marketplace fairness for other restaurants. For example, the marketplace fairness module 160B may accept among its inputs a set of restaurants in the marketplace that are local to a consumer (e.g., within delivery distance), and may output a score for the restaurant in question that indicates how frequently the restaurant receives exposure as compared with the other restaurants in the set. In another example embodiment, the marketplace fairness module may output a list of the restaurants ordered by frequency of delivery orders received. Such information could be used by the system 130 to promote restaurants that do not currently receive many delivery orders, for example by displaying information about new and relatively unknown restaurants more prominently than (e.g., earlier in a set of search results than) information about established popular restaurants that already receive many orders and a large amount of exposure.

The gross earnings module 160C may generate values that can be used to optimize for increased income, e.g., for the organization sponsoring the system 130 and for the restaurants. The objective related to the gross earnings module 160C might be to maximize earnings for the system or for the restaurants. In one embodiment, the gross earnings module 160C may receive information about the cost of different items on a restaurant menu as input, and may output one or more values related to an amount of money the system 130 and the restaurant is likely to make through deliveries. For example, given a particular restaurant-consumer pairing, the gross earnings module 160C may output a prediction of the amount of money the consumer is likely to spend if the consumer was to order from the particular restaurant.

The partner reliability module 160D may generate values or scores related to one or more delivery partners. For example, the partner reliability module 160D may be associated with the objective of making sure that each delivery partner in a marketplace is assigned enough deliveries and doesn't sit idle when available for making deliveries. In one embodiment, the partner reliability module 160D may accept information about the location of delivery partners, the availability of the delivery partners in the marketplace, how often the delivery partner delivers ahead or behind schedule, restaurants the delivery partner tends to deliver from, and so forth. In one embodiment, the partner reliability module 160D may output a partner reliability score that indicates an extent to which a delivery from a given restaurant to a given consumer will contribute to evening out the delivery load among all available delivery partners in an area. For example, a restaurant that is currently nearest to a delivery partner who has not been recently assigned a delivery may receive a higher partner reliability score than a restaurant that is near delivery partners who have been busy making many deliveries. In another embodiment, the partner reliability module 160D may output a list of available delivery partners in the area ordered by how recently each delivery partner has made a delivery.

The customer happiness module 160E is related to the objective of keeping consumers happy with the food and services they receive so that they return to the system 130 in the future for their food delivery needs. Accordingly, the customer happiness module 160E may receive information about restaurant ratings, and whether consumers make repeat orders from restaurants, as input. In one example embodiment, the customer happiness module 160E may output a likelihood score related to whether a consumer is likely to have a positive experience ordering from a given restaurant and whether the consumer is likely to order food delivery from the system 130 again if the consumer orders from the given restaurant.

The optimization module 170 generates a recommendation 220 score for the consumer-restaurant pair. That is, the optimization module 170 outputs a personalized recommendation score of a restaurant for a consumer. The recommendation score accounts for the multiple objectives as represented by the values produced at the objective modules 160. To incorporate information from all of the objectives, the optimization module 170 applies the values output by the various objective modules 160 to a model or algorithm (e.g., linear programming or quadratic programming algorithm) that can generate the recommendation 220. The algorithm may be preprogrammed by an administrator or developer of the system 130, for example, when an objective and accompanying objective module 160 is added or removed from the system 130. Adjusting the algorithm of the optimization module 170 to a different set of objective modules 160 may include introducing new threshold optimization values associated with the different objectives. In one example embodiment, an algorithm for the optimization module 170 generates a sum of the values produced by the market fairness module 160B, the gross earnings module 160C, the partner reliability module 160D, and the customer happiness module 160E, each objective value in the sum being multiplied by a weight associated with a threshold optimization value, and multiples the result by the output value of the demand prediction module 160A to generate a recommendation 220 value.

Figure 3:
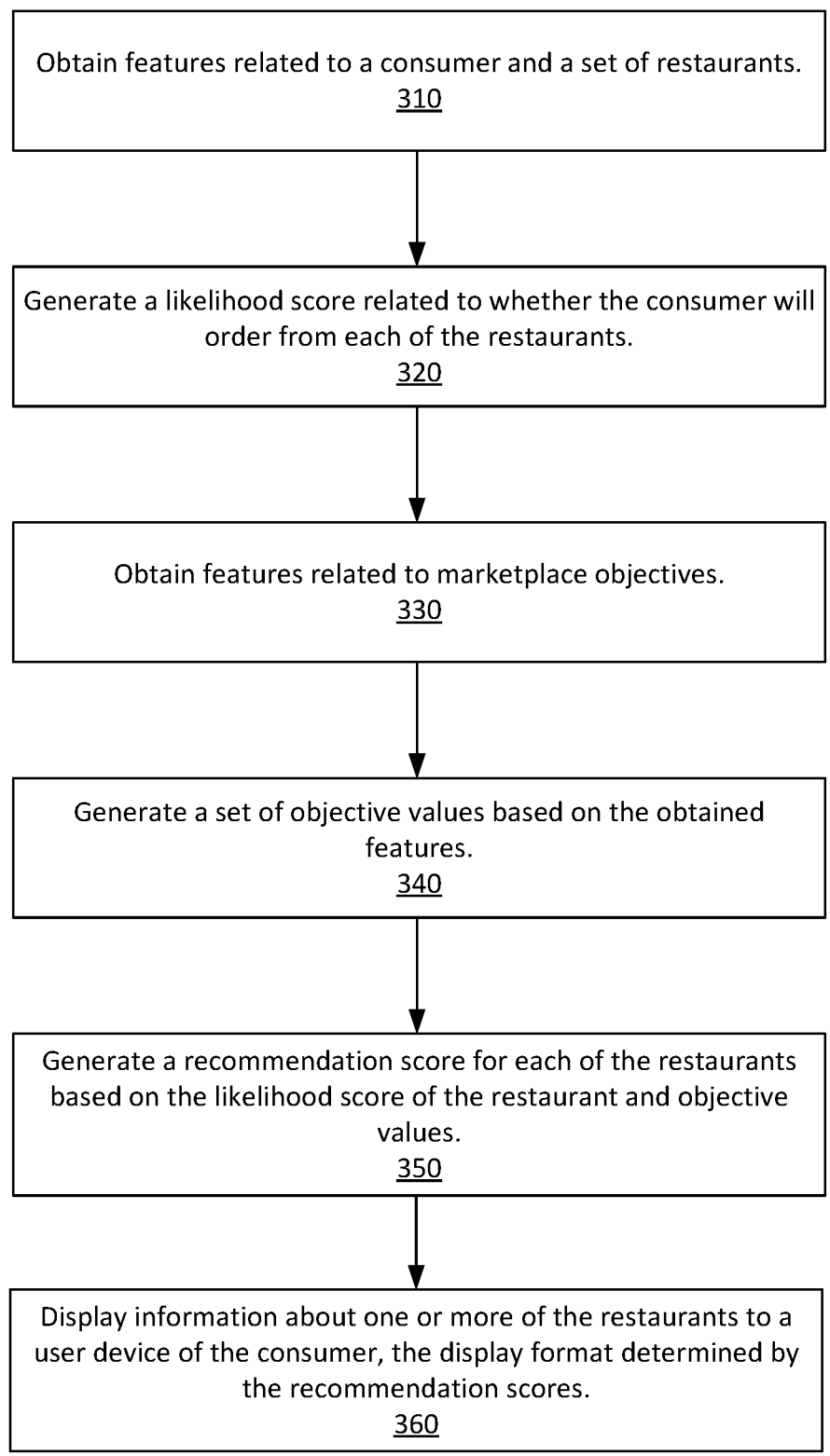
FIG. 3 is a flowchart illustrating a method of generating and presenting recommendations to users, in accordance with an example embodiment.

FIG. 3 is a flowchart illustrating a method of generating and presenting recommendations to users, in accordance with an example embodiment. The system 130 obtains 310 features related to a consumer, features related to a set of restaurants, and contextual features. In some embodiments, the features may be "real-time" values in that they may be the most recently collected values, ensuring that the recommendation 220 will be made in view of present conditions (e.g., food for the appropriate meal period, and restaurants that are currently open, may be recommended). For each of the restaurants in the set of restaurants, the system 130 generates 320 a likelihood score that represents a likelihood that the consumer will order from the restaurant.

The system 130 may additionally obtain 330 features related to a set of marketplace objectives (e.g., user features, restaurant features, or contextual features that may be used as inputs to objective module 160). As with the features related to the consumer and the set of restaurants, the features that are related to marketplace objectives may be real-time values. Using the features related to the marketplace objectives, the system 130 generates 340 a set of objective values. For example, each objective module 160 may apply a trained computer model to a set of input data to generate a value related to the associated objective.

The system 130 generates 350 a recommendation score for each of the restaurants in the set of restaurants, the recommendation score being a value for a restaurant with respect to the particular consumer. The recommendation score is based on the generated likelihood score and on one or more of the values in the set of generated objective values. The recommendation scores for each of the restaurants may be used to present information about the restaurants to the consumer. The system 130 displays 360 information about one or more of the restaurants from the set of restaurants at a user device 100 of the consumer. For example, the order in which information about restaurants is displayed on a screen of the user device 100 may be based on the recommendation scores associated with each of the restaurants.

Figure 4:
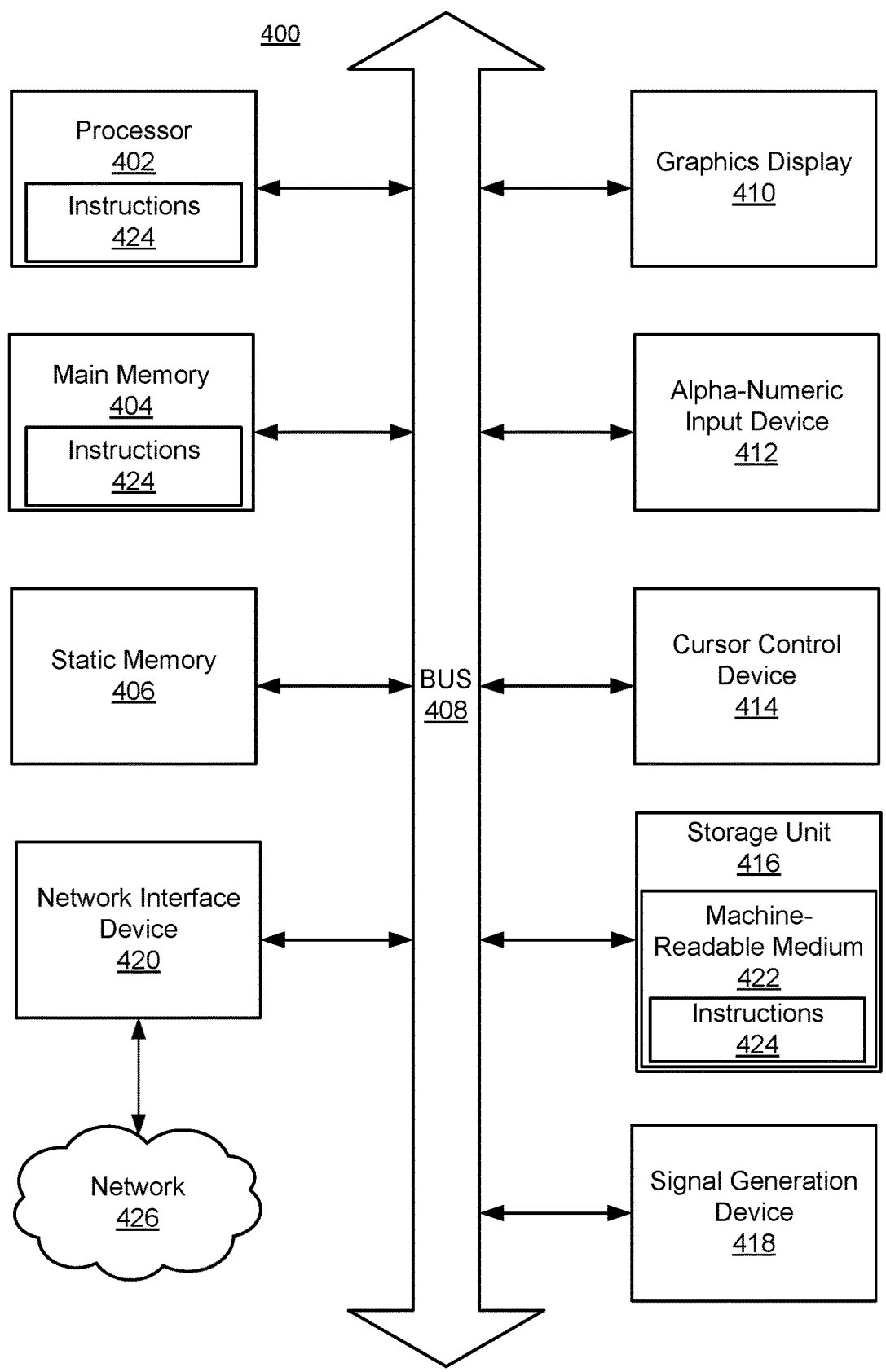
FIG. 4 is a block diagram illustrating components of an example machine for reading and executing instructions from a machine-readable medium, in accordance with an example embodiment.

FIG. 4 is a block diagram illustrating components of an example machine able to read instructions from a machine-readable medium and execute them in one or more processors (or controllers). Specifically, FIG. 4 shows a diagrammatic representation of a system 130 in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 406 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include instructions for implementing the functionalities of the model generator 140, the optimization module 170, or of the one or more objective module 160. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer-readable storage medium storing computer program instructions executable by one or more processors of a computing system to perform steps comprising:

for each of a set of multiple different objectives for the network service:
  obtaining a threshold optimization value for the objective;
  accessing labeled training data associated with the objective;
  training a machine learning model, using the labeled training data, to produce an objective value related to the objective;
adjusting an optimization module to generate a user recommendation score using the objective values output by the trained machine learning models associated with the set of objectives, the recommendation score based on an optimization of each of the objective values toward the obtained threshold optimization value for the objective;
obtaining current features related to a user of a network service and a set of entities associated with the network service;
obtaining current features related to the set of objectives for the network service;
generating, by providing the obtained current features related to the set of objectives to the trained machine learning models, a set of objective values, each of the set of objective values associated with an objective of the set of objectives, wherein at least one of the objective values is a marketplace fairness score that represents how frequently an entity receives exposure to client devices of users compared with other entities associated with the network service;
for each entity of the set of entities:
  generating a likelihood score quantifying whether the user will find the entity to be favorable, the likelihood score based on the current features related to the user and the current features related to the entity;
  generating a user recommendation score for the entity, the user recommendation score based on the likelihood score and the set of objective values; and
displaying information about one or more of the entities to a client device of the user.

2. The non-transitory computer-readable storage medium of claim 1, the steps further comprising:
training a first model associated with one of the multiple different objectives to generate a probability that a user will find an entity to be favorable, the training taking as input: information about the entity, information about the user, and contextual information.

3. The non-transitory computer-readable storage medium of claim 1, wherein obtaining current features related to a user of a network service comprises:
responsive to a user opening an application on a client device:
  requesting contextual user data from the client device; and
  receiving a subset of the requested contextual user data from the client device.

4. The non-transitory computer-readable storage medium of claim 1, wherein the format of the displayed information is determined using the recommendation scores of the entities.

5. The non-transitory computer-readable storage medium of claim 1, wherein generating the user recommendation score comprises applying, by the optimization module, a constrained quadratic programming algorithm to the generated objective values and the likelihood score.

6. The non-transitory computer-readable storage medium of claim 5, wherein constraints applied to the quadratic programming algorithm include the threshold optimization values associated with each of the objectives for the network service.

7. A computer-implemented method, performed by one or more computer processors, for recommending entities to users on a platform for a network service, the computer-implemented method comprising:

for each of a set of multiple different objectives for the network service:
  obtaining a threshold optimization value for the objective;
  accessing labeled training data associated with the objective;
  training a machine learning model, using the labeled training data, to produce an objective value related to the objective;
adjusting an optimization module to generate a user recommendation score using the objective values output by the trained machine learning models associated with the set of objectives, the recommendation score based on an optimization of each of the objective values toward the obtained threshold optimization value for the objective;
obtaining current features related to a user of the network service and a set of entities associated with the network service;
obtaining current features related to the set of objectives for the network service;

generating, by providing the obtained current features related to the set of objectives to the trained machine learning models, a set of objective values, each of the set of objective values associated with an objective of the set of objectives, wherein at least one of the objective values is a marketplace fairness score that represents how frequently an entity receives exposure to client devices of users compared with other entities associated with the network service;

for each entity of the set of entities:
generating a likelihood score quantifying whether the user will find the entity to be favorable, the likelihood score based on the current features related to the user and the current features related to the entity;
generating a user recommendation score for the entity, the user recommendation score based on the likelihood score and the set of objective values; and
displaying information about one or more of the entities to a client device of the user.

8. The computer-implemented method of claim 7, further comprising:
training a first model associated with one of the multiple different objectives to generate a probability that a user will find an entity to be favorable, the training taking as input: information about the entity, information about the user, and contextual information.

9. The computer-implemented method of claim 7, wherein obtaining current features related to a user of a network service comprises:
responsive to a user opening an application on a client device:
requesting contextual user data from the client device; and
receiving a subset of the requested contextual user data from the client device.

10. The computer-implemented method of claim 7, wherein the format of the displayed information is determined using the recommendation scores of the entities.

11. The computer-implemented method of claim 7, wherein generating a user recommendation score for an entity comprises applying, by the optimization module, a constrained quadratic programming algorithm to the generated objective values related to the set of objectives and the likelihood score.

12. The computer-implemented method of claim 7, wherein the set of objectives includes: market fairness, gross earnings, delivery partner reliability, and consumer happiness.

* * * * *